United States Patent [19]

O'Farrill

[11] Patent Number: 5,738,328
[45] Date of Patent: Apr. 14, 1998

[54] MULTIPLE USE STABILIZER LANYARD WITH STIRRUP

[76] Inventor: Dave O'Farrill, 530 Pine St., Chico, Calif. 95928

[21] Appl. No.: 548,965

[22] Filed: Oct. 27, 1995

[51] Int. Cl.$^6$ .................................................. A47B 97/00
[52] U.S. Cl. ..................... 248/500; 248/158; 248/181.1; 24/170
[58] Field of Search ................................. 248/500, 506, 248/160, 411, 412, 177.1, 187.1, 188.8, 346.03, 514, 519, 317, 341, 181.1, 188.9, 339, 58, 62; 24/170, 115 H, 302

[56] References Cited

U.S. PATENT DOCUMENTS

| | | | |
|---|---|---|---|
| 1,766,090 | 6/1930 | Worsching | 248/158 |
| 2,343,050 | 2/1944 | Fischer | 248/181.1 |
| 2,464,500 | 3/1949 | Graham | 248/181.1 |
| 2,560,884 | 7/1951 | Nagourney | 248/181.1 |
| 3,016,802 | 1/1962 | Grunenberg | 248/186.2 |
| 3,317,169 | 5/1967 | Hendricks | 248/188.2 |
| 3,575,369 | 4/1971 | Tetlon | 248/158 |
| 4,155,636 | 5/1979 | Reeberg | 354/293 |
| 4,266,867 | 5/1981 | Reeberg | 354/293 |
| 4,305,557 | 12/1981 | Kowalski | 248/62 |
| 4,328,917 | 5/1982 | Reeberg | 224/254 |
| 4,487,387 | 12/1984 | Heath | 248/62 |
| 4,881,303 | 11/1989 | Martini | 24/170 |
| 4,942,721 | 7/1990 | Van Scoyk | 54/46 |
| 5,005,527 | 4/1991 | Hatfield | 24/170 X |

*Primary Examiner*—Leslie A. Braun
*Assistant Examiner*—Anita M. King

[57] ABSTRACT

A stabilizing lanyard with stirrup holds cameras and other devices requiring stabilizing firmly free of body movement when the attached device is held upward with the user having a foot in the stirrup on the ground and pulling upward to create an isometric pull for stabilization of the held device. The invention is useful for stabilizing still cameras, video cameras, firearms and other hand-held equipment requiring a stable environment. The device of the invention folds into a compact package easily carried in the camera case or in a user's pocket or slung from a firearm. The user of a camera can pan or swing the camera quickly in any direction or angle necessary to pick up subjects in action. A firearm can be turned to track a moving target for accuracy.

4 Claims, 4 Drawing Sheets

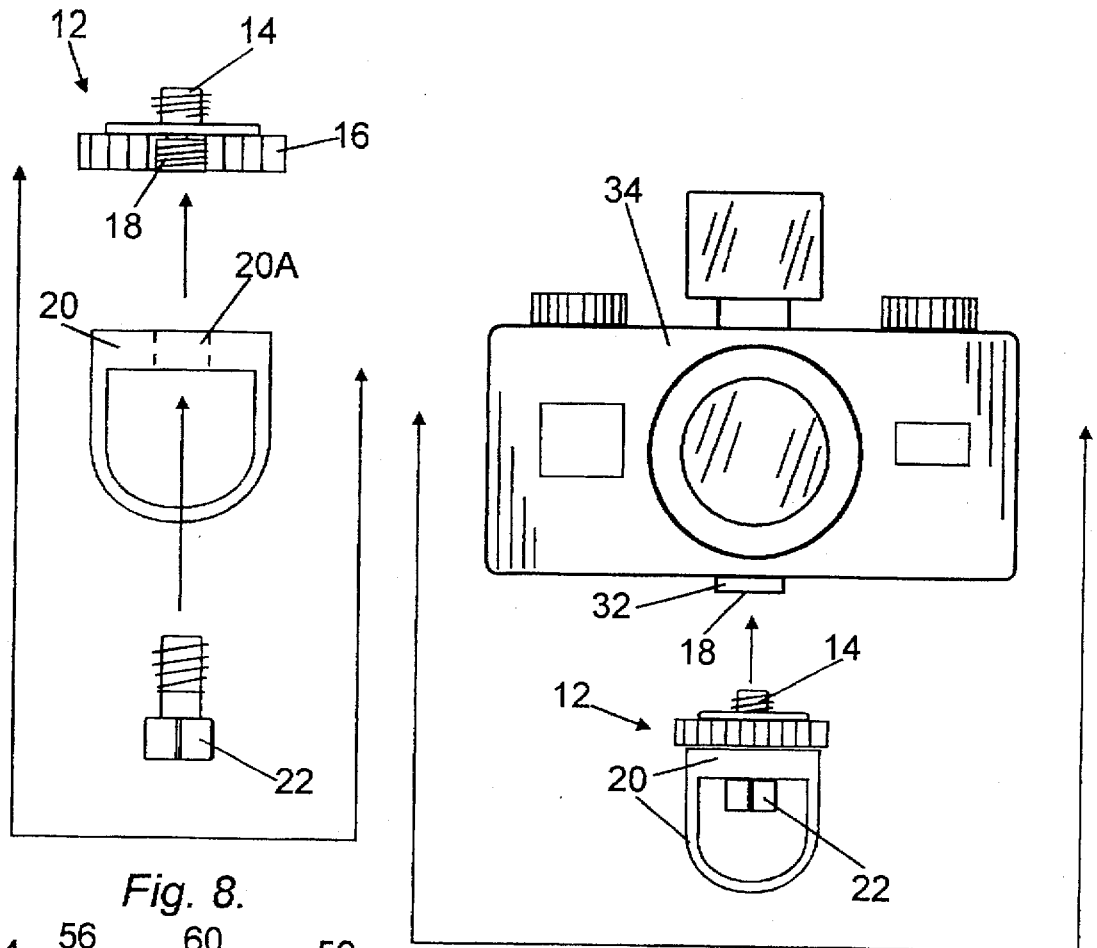
Fig. 8.
Fig. 9.
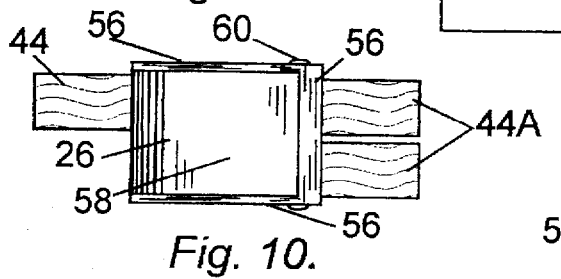
Fig. 10.
Fig. 11.
Fig. 12.

5,738,328

MULTIPLE USE STABILIZER LANYARD WITH STIRRUP

BACKGROUND OF THE INVENTION

1. Field of the Invention

This invention relates to devices useful for stabilizing photography equipment, video equipment, firearms, and the like. As related to photography and videography, a tripod or a mono-pod is used to prevent camera movement from breathing or body movements. Tripods are effective but bulky to carry. Monopods are not isolated due to the fact the user must in some way hold the monopod causing movement. As related to firearms, when a firearm is discharged in most cases the muzzle will rise and the user must re-sight and compensate the weapon before discharging it at a designated target. A stabilizing device that is efficient, lightweight, and compact is needed. The art of the present invention has been developed to fill that need.

2. Description of the Prior Art

It is not difficult to find a variety of devices useful for stabilizing cameras and other compatible photographic equipment and for firearms. A large variety of tripods, monopods and other stands are shown in past art patents and many are available in the market place.

SUMMARY OF THE INVENTION

Therefore, in my invention, we do provide a strap-type stabilizer in the form of a lanyard and a stirrup that can be affixed to a variety of equipment including a still camera, a video camera, firearms and any other compatible equipment needing stabilization during use. The stirrup has a ground plate attached at the bottom in a manner to spread out the stirrup strap and provide a place for a user to place his or her foot. With the toe of one foot in the stirrup and pressing down to a solid position on the ground, the user can raise the attached piece of equipment upward until the lanyard becomes tight. By keeping an isometric upward pull on the attached piece of equipment, the user can stabilize it efficiently to prevent practically all normal movement that usually distorts many photos and causes the shooter to miss a target when using a firearm. To produce isometric tension, very little physical strength is required. The lanyard is adjustable and the upward position of the attached equipment can be set as best suited for the photographer to use his view lens or range finder and for a shooter to aim a firearm. In a crowd situation, a photographer can lengthen the lanyard and place the camera at an arms length over his/her head, stabilize the camera by stepping on the stirrup plate, and get good pictures of actions he/she cannot actually see.

It is therefore, a principal object of the present invention to provide a stabilizing lanyard with a stirrup that will hold attached equipment practically free of body movement when the equipment is held upward and the user's foot is in the stirrup on the ground.

Another object is to provide a stabilizing device that is useful in a variety of situations and will fold into a compact package that can be easily carried in the user's pocket, camera case or can be slung from a firearm.

A further object of my invention is to provide a stabilizer that the user to pan smoothly with a still camera or a video camera to follow a moving object.

A still further object as related to a firearm, the user may smoothly track and pursue a moving target in much the same manner as a photographer uses the device to pan.

Other objects and the many advantages of the present invention will be better understood by reading the following specification referencing described numbered parts therein with like numbered parts illustrated in the drawings.

BRIEF DESCRIPTION OF THE DRAWINGS

The drawings include:

FIG. 8 showing an enlarged exploded view of the swivel attachment assemblage that fastens the lanyard and stirrup of the invention to any industry standard sized receiver for the threads that would normally be used for stabilization and attachment of a support device. A knurled collar is affixed with a threaded shank on an upper side sized to fit a receiver. The under side of the collar has a threaded aperture sized to accept a swivel retainer bolt that holds a swivel ring to the collar when the device is assembled.

FIG. 9 showing in an enlarged view of how the swivel assemblage when ready for installation would be attached to a camera;

FIG. 10 showing a top plan view enlarged of the adjustable cam/jam buckle used to adjust the length of the lanyard in this invention;

FIG. 11 showing the adjustable cam/jam buckle opened in an enlarged view;

FIG. 12 showing an enlarged side view of the cam/jam buckle illustrating how the top is opened to adjust the straps and closed to lock the straps in place, and FIG. 13 showing how a firearm, a rifle in the illustration, would be stabilized using the present invention.

DESCRIPTION OF THE PREFERRED EMBODIMENTS

Figure 1:
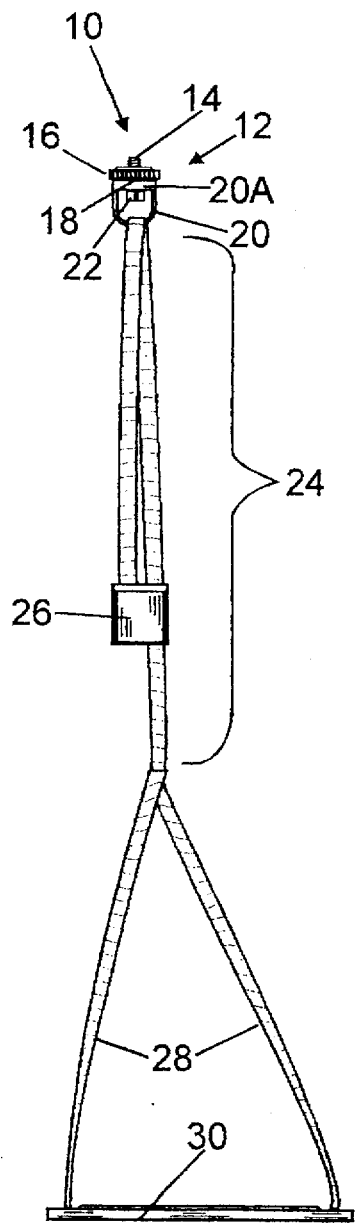
FIG. 1 showing a stabilizer lanyard with stirrup in accordance with the present invention.

Referring now to the drawings where the invention in general is designated invention 10. In the FIG. 1 drawing, numerical parts include: attachment assemblage 12, for attachment of the present invention to a device to be stabilized, for example, a camera. A threaded bolt shank 14 is in the top of a knurled bolt head collar 16. Knurled bolt head collar 16 is specially designed for finger tightening industry standard threads on bolt shank 14 with like threads used normally on still and video cameras for attachment of tripods and on firearms for slings. Aperture 18 in the base of knurled bolt head collar 16 accepts screw-in attachment of bolt 22 that passes through aperture 20A, see FIG. 8, and holds swivel ring 20 after the upper loop of adjustable lanyard 24 has been passed through swivel ring 20. Lanyard 24 is affixed with adjustable cam/jam buckle 26 at a downward position just above where a second strap attaches to produce a stirrup loop 28. Holding stirrup loop 28 open at the bottom is stirrup ground plate 30. Adjustable cam/jam buckle 26 allows lanyard 24 to be lengthened and shortened according to use needs.

Figure 2:
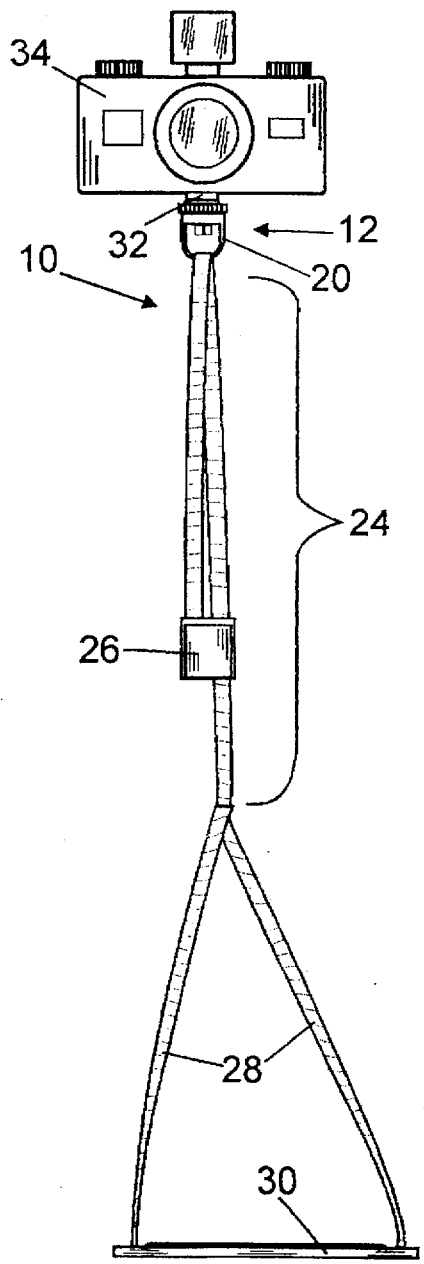
FIG. 2 showing the invention affixed by swivel attachment to the tripod screw of a still camera for the purpose of illustration.
Figure 3:
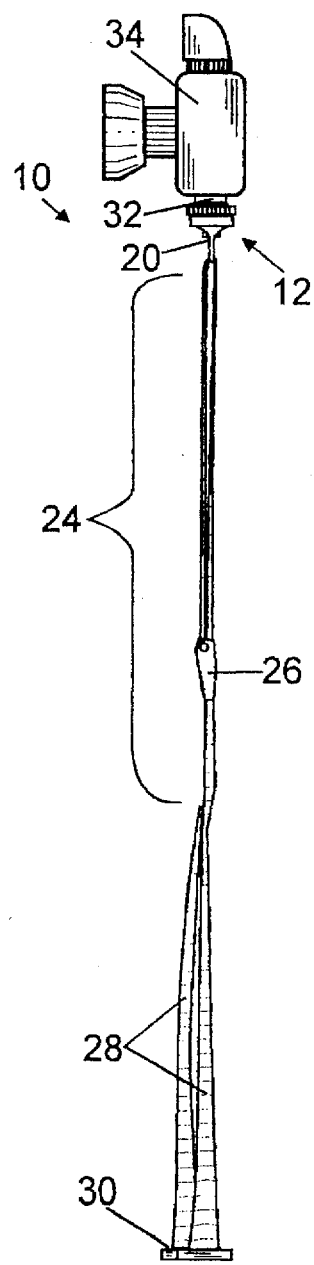
FIG. 3 showing a side view of the invention with a camera attached for the purpose of illustration.

FIG. 2 shows invention 10 affixed by swivel attachment 12 to tripod receptacle 32 of hand camera 34. In FIG. 3, a side view of attachment assemblage 12 affixing lanyard 24 and stirrup 28 to hand camera 34 is shown.

Figure 4:
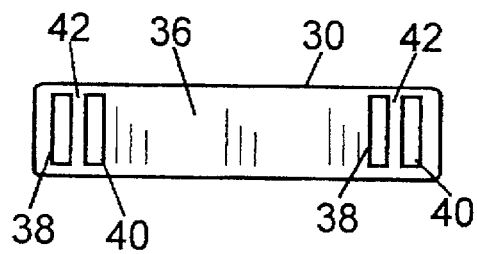
FIG. 4 showing a top plan view of a stirrup ground plate, the plate the user stands on, in accordance with this invention.
Figure 5:
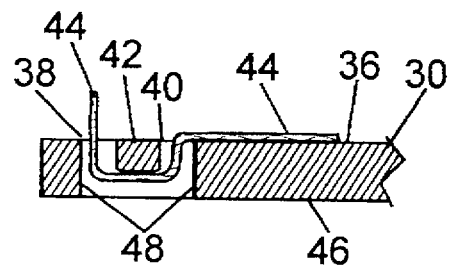
FIG. 5 showing an enlarged view of an end section of the stirrup ground plate illustrating how the stirrup strap is attached through receiver openings and is run along the upper side of the ground plate to prevent the strap contacting a rough ground surface. The thickness of the strap cleat that the strap wraps around is less than the thickness of the ground plate and is in a recessed compartment that also prevents the wrapped surface of the strap from ground contact.
Figure 6:
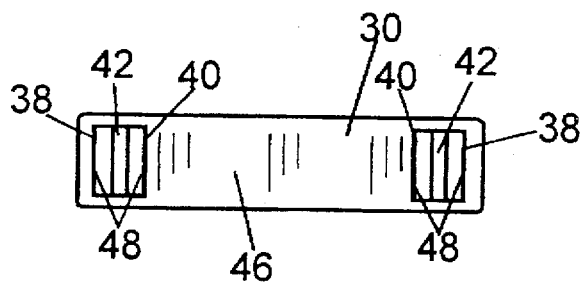
FIG. 6 showing the stirrup ground plate in a bottom plan view. The recessed compartments with shortened strap cleats and strap receiver openings at each end can be seen.
Figure 7:
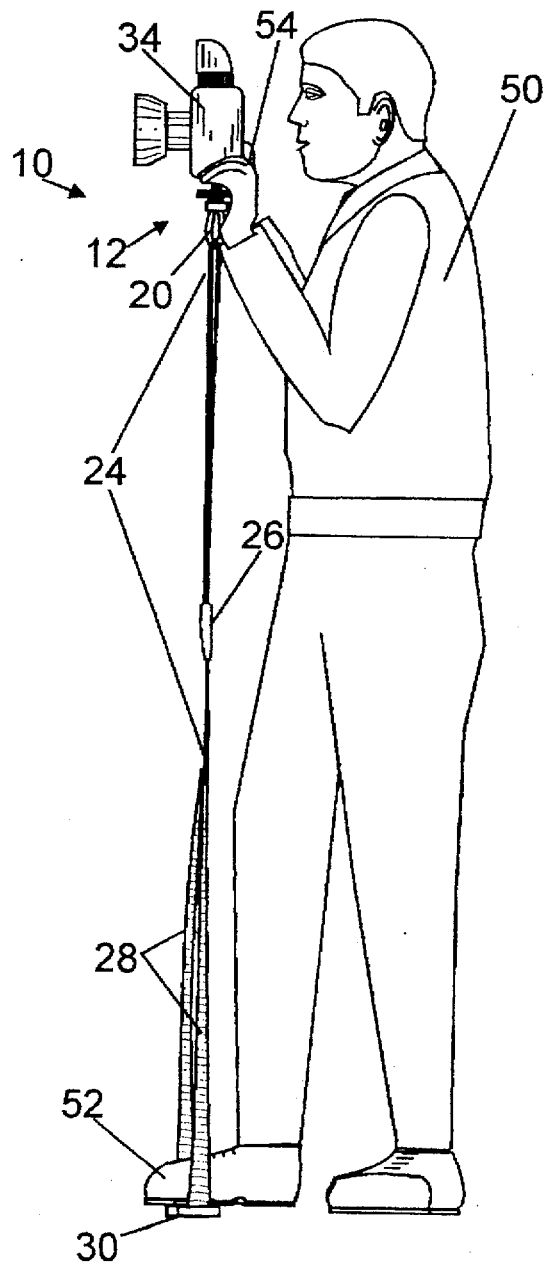
FIG. 7 showing the device of this invention in use stabilizing a still camera in use by a photographer standing with a foot on the stirrup plate and pulling upward to produce isometric pressure between the base of the camera and his foot on the stirrup plate.

The stirrup ground plate 30 used to hold stirrup 28 open and for a user 50, see FIG. 7, to put his foot on is illustrated enlarged and detailed in FIGS. 4, 5, and 6. FIG. 4 is a top plan view of ground plate 30 showing upper surface 36 with belt openings 38 and 40 at each end. Strap cleat 42 is the cross center section between each of the belt receiver openings 38 and 40. 38 designates the outer strap openings and 40 designates the inner strap openings. An enlarged section of an end of ground plate 30 shown in FIG. 5 illustrating how stirrup strap 44 passes around cleat 42 in recess 48 clear of any ground contact. 36 is the upper surface of ground plate 30 and 46 indicates the lower surface. FIG. 6 shows ground plate 30 from the under side in a bottom plan view. The strap receiver openings 38 and 40 with cleat 42 between them can be seen in recess 48 at both ends of ground plate 30.

In FIG. 7, user 50 is using invention 10 to stabilize still camera 34. He has lengthened lanyard 24 by adjusting it with cam/jam buckle 26 so the view finder of camera 34 is at his personal eye level. He is holding ground plate 30 pressed to the ground by his foot 52. He has pulled up on camera 34 with his hands 54 to tighten stirrup 28 and lanyard 24 until camera 34 is in a firm and stable position. User 50 can pan with camera 34, tilt it, or swing to almost any angle quickly to capture action shots and still maintain the stability of camera 34. This could also be done with a video camera to catch action movement or with a firearm to track a moving target.

Swivel camera attachment assemblage 12 is shown enlarged and exploded in FIG. 8. Shank 14 out of the top of knurled bolt head collar 16 is threaded to fit industry standard receiver threading on still cameras where the cameras accept tripod attachment. Bolt 22 fits up through swivel ring bolt aperture 20A to hold swivel ring 20 to knurled bolt head collar 16 screwed into industry standard screw receiver 18. Camera attachment assemblage 12 is specially designed for the purpose of attaching invention 10 to a receiving device. Knurled collar 16 allows easy finger tightening and loosening of assemblage 12. For illustrative purposes, FIG. 9 shows assemblage 12 ready for attachment to camera 34. The lanyard strap 44 would be run through swivel ring 20 prior to attachment.

FIGS. 10, 11, and 12 shows how an adjustable cam/jam buckle 26 is structured. FIG. 8 is a top plan view showing buckle 26 in a closed and locked position. Belting 44A, the upper ends of lanyard 24 are shown at one end of buckle 26 and a continuation of strap 44 just before it attaches to stirrup 28 is shown at the other end. Buckle 26 consists of a bottom with angled up walls 56 and an openable cap 58 operational on pin hinge 60. FIG. 11 shows buckle 26 in the open position. Cam/jam lock 64, affixed to open and close with pin hinge 60, is adjacent pin hinge 60 and belt receiver slots 64 are in the bottom of the housing of buckle 26. Opening cap 58 of buckle 26 frees up straps 44 and 44A and allows for the adjustment of lanyard 24. Cross members 66 in buckle 26 guide strap 44 from an upper position to a lower position out the end of buckle 26. The opening and closing of buckle cap 58 can be seen in the side view of adjustable cam/jam buckle 26 in FIG. 12. Movement arrow 62 indicates the opening and closing of cap 58.

Figure 13:
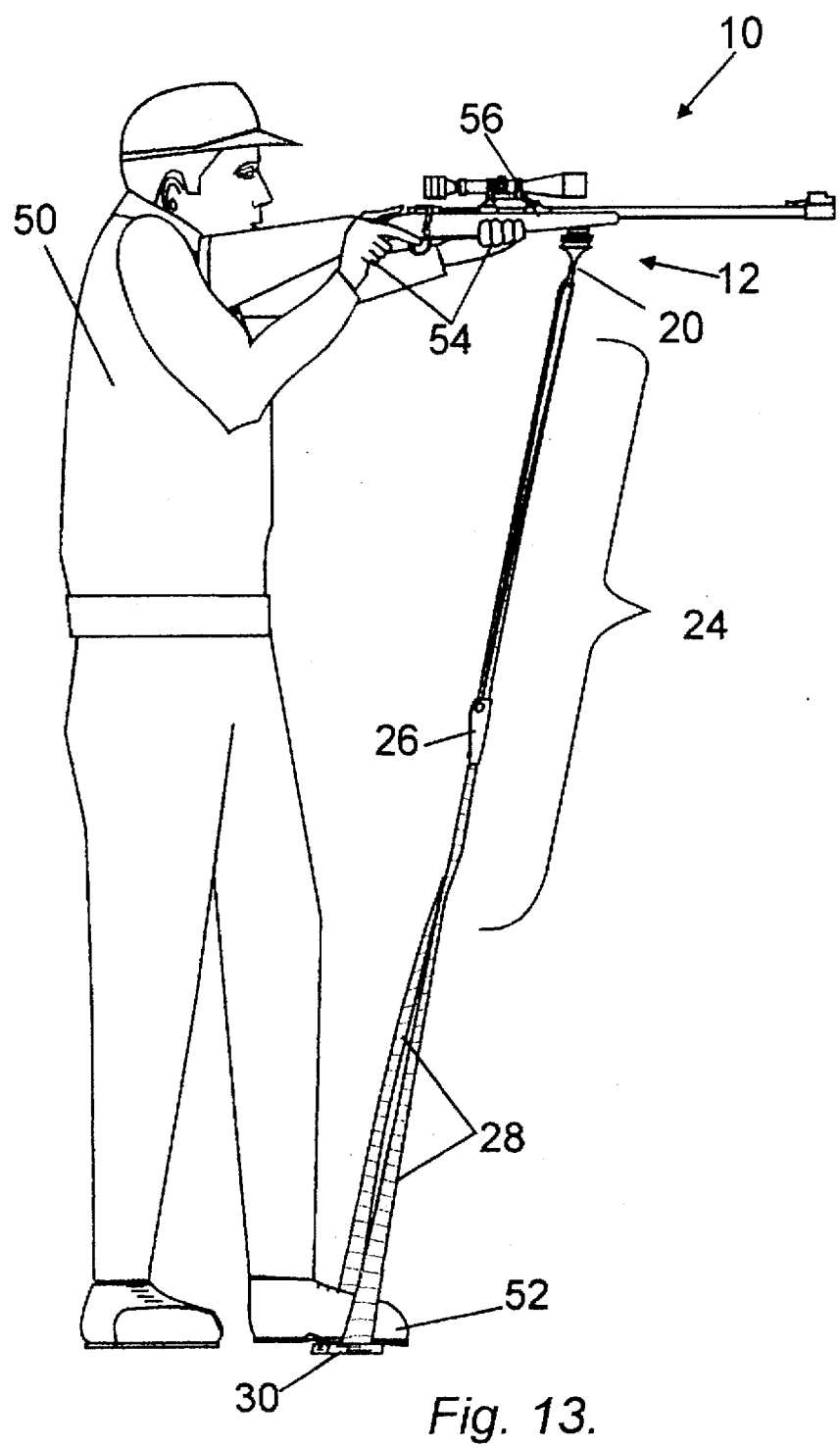

FIG. 13 shows how the present invention 10 would be used to stabilize a rifle 56. User 50 places his foot 52 in stirrup 28 on ground plate 30 and pulls upward with his hands 54. Rifle 56 is stabilized and user 50 can aim at a fixed target or move around to track a moving target.

From the foregoing, one skilled in the art should understand the structure and operation of invention 10. However, it is to be understood that although we have described an embodiment of my invention with considerable detail and have illustrated it extensively in the drawings, we reserve the right to make changes in the design and structure of the invention so long as changes made remain within the scope of my appended claims. Also, others are restricted from making changes to the invention with the intent to present a changed device as a new invention when the changes fall within the scope of my claims.

What I claim as my invention is:

1. A stabilizer lanyard for attaching a piece of equipment to a device having industry standard sized threads in receivers on still cameras, video cameras, firearms, and the like, said stabilizer lanyard comprising:

a strap having a bottom portion formed into a stirrup;

means for adjusting the length of the strap;

means for maintaining an opened looped end on said stirrup;

means for swiveling attachment of said stabilizer lanyard to a receiver on said piece of equipment; and said means for maintaining the opened looped end further includes a ground plate having a plurality of openings at each end thereof threadably receiving the strap therethrough for holding the stirrup in an open position to sufficiently allow a users' foot to fit into said opened looped end.

2. The device of claim 1 wherein said means for adjusting said lanyard includes an adjustable cam/jam buckle.

3. The device of claim 1 wherein said means for swiveling attachment of said stabilizer to said receiver on said piece equipment includes a swiveling assemblage.

4. The device in claim 3, wherein said swivel assemblage comprises a threaded shank affixed protruding from a top surface of a knurled bolt head collar; a pivot bolt; a swivel ring; said bolt fitting through an aperture in a widen part of said swivel ring attaching to threads in a receiver aperture opened in an underside of said knurled bolt head collar to hold said swivel ring mobile affixed to said underside of said knurled bolt head collar, and said swivel ring being of sufficient size to allow passing therethrough of small straps and cords.

* * * * *